United States Patent [19]
Graham et al.

[11] 3,856,965
[45] Dec. 24, 1974

[54] METHOD FOR TREATING HYPERTENSION

[75] Inventors: Boyd E. Graham; Louis L. Skaletzky, both of Kalamazoo, Mich.

[73] Assignee: The Upjohn Company, Kalamazoo, Mich.

[22] Filed: May 17, 1973

[21] Appl. No.: 361,278

[52] U.S. Cl. ............................................. 424/273
[51] Int. Cl. ............................................ A61k 27/00
[58] Field of Search ................................. 424/273

[56] References Cited
UNITED STATES PATENTS
3,399,212   8/1968   Hoover et al. ...................... 424/273

*Primary Examiner*—Jerome D. Goldberg
*Attorney, Agent, or Firm*—John J. Killinger; Roman Saliwanchik

[57] ABSTRACT

A method of treating hypertension in mammals, including humans, is disclosed which comprises administering effective amounts of compounds having the formula:

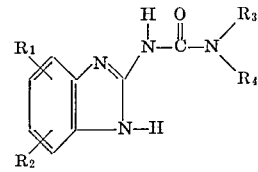

and their pharmaceutically acceptable acid addition salts wherein $R_1$ and $R_2$ are each hydrogen, halogen, lower alkyl, lower alkoxy or trifluoromethyl provided that when $R_1$ is hydrogen $R_2$ is not hydrogen; $R_3$ and $R_4$ are hydrogen or lower alkyl.

14 Claims, No Drawings

METHOD FOR TREATING HYPERTENSION

BACKGROUND OF THE INVENTION

1. Field of the Invention

The invention concerns a novel method of treating hypertension in mammals including humans. More specifically, the invention concerns the use of 2-benzimidazolylureas for the treatment of hypertension in mammals.

2. Description of the Prior Art

Belgian Pat. No. 768,300 of June 9, 1971, discloses 2-acetamidobenzimidazoles as hypotensive agents.

Copending U.S. patent application of Skaletzky, Ser. No. 361,277 filed of even date herewith (Case 2881) discloses that 5,6-dialkoxy-2-aminobenzimidazoles are useful hypotensive agents.

SUMMARY OF THE INVENTION

The invention comprises a method of treating hypertension in mammals which comprises administering to said mammals an effective amount of a compound selected from those of formula:

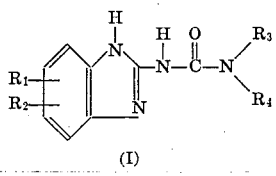

(I)

and the pharmaceutically acceptable acid addition salts thereof, wherein $R_1$ and $R_2$ are each selected from hydrogen, halogen, lower alkyl, lower alkoxy and trifluoromethyl provided that when $R_1$ is hydrogen, $R_2$ is halogen, lower alkyl, lower alkoxy or trifluoromethyl; $R_3$ and $R_4$ are each selected from hydrogen and lower alkyl.

The term "halogen" is used throughout the specification and claims as meaning bromine, chlorine, iodine, and fluorine.

The term "lower alkyl" is used herein to mean alkyl having from one to three carbon atoms, inclusive. Illustrative of lower alkyl are methyl, ethyl, propyl and isomeric forms thereof.

The term "lower alkoxy" is used herein to mean the monovalent moiety of formula:

—O—lower alkyl wherein lower alkyl is as defined above. Illustrative of lower alkoxy is methoxy, ethoxy, n-propoxy and isopropoxy.

Preferred compounds of the formula (I) and the acid addition salts thereof for use in carrying out the method of the invention are those wherein $R_1$ and $R_2$ are each hydrogen, bromine, chlorine, methyl or methoxy (with the limitation that $R_1$ and $R_2$ are not both hydrogen) and $R_3$ and $R_4$ are selected from hydrogen and methyl.

Also within the method of the invention is the use of the compounds (I) and their pharmacologically acceptable acid addition salts in formulations with other active hypotensive agents, diuretics, tranquilizers and like adjuvants for treating hypertension.

DETAILED DESCRIPTION OF THE INVENTION

Effective amounts of the compounds (I) and their pharmaceutically acceptable acid addition salts for treatment of hypertension in mammals, including humans, varies with weight, age, physical condition, route of administration and species of mammal to be treated. In general, the effective amount lies within the range of from about 0.5 mg. to about 50 mg. per kilogram body weight of the recipient mammal, administered daily. Preferably, the amount employed in the method of this invention is within the range of from about 0.5 mg. to about 40 mg. and most preferably 5 mg. to 25 mg. per kilogram body weight of the mammal under treatment, administered daily in single or divided dose.

The method of the invention is carried out by administering the compounds (I) or their pharmaceutically acceptable acid addition salts by conventional modes of administration. For example, administration may be by oral or parenteral routes.

A compound of the Formula (I) or a pharmacologically acceptable acid addition salt thereof is presented for oral administration in solid and liquid unit dosage forms, such as tablets, capsules, powders, granules, syrups, elixirs, and the like, containing effective amounts of the compound (I) or its pharmaceutically acceptable acid addition salt as the essential active ingredient.

Powders are prepared by comminuting a compound of the Formula (I) or pharmacologically acceptable acid solution salts thereof to a suitably fine size and mixing with a similarly comminuted diluent. The diluent may be conventionally employed diluents, for example an edible carbohydrate material such as starch or lactose. Advantageously, a sweetening agent or sugar is present as well as a flavoring agent.

Dry granulations for reconstitution with water are prepared utilizing water-soluble diluents. A powder mixture of finely divided compound of the Formula (I) or pharmacologically acceptable acid addition salts thereof and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting and flavoring agent.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing a compound of the Formula (I) and pharmacologically acceptable acid addition salts thereof suitably comminuted, with a diluent or base such as starch, lactose, kaolin, dicalcium phosphate and the like. The powder mixture may be granulated by wetting with a binder such as corn syrup, gelatin solution, methylcellulose solution or acacia mucilage and forcing through a screen. An alternative granulating procedure is slugging the powder mixture, i.e.; running the powder mixture through a tablet machine and breaking the resulting large tablets into pieces (slugs). The slugs may be lubricated to prevent sticking to the tablet-forming dies by means of the addition of stearic acid, a stearate salt, talc, or mineral oil. The lubricated mixture is then compressed into tablets of the required weight.

Advantageously, the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of a compound of the Formula (I) and pharmacologically acceptable acid addition salts thereof for administration.

A syrup is prepared using a water soluble salt of a compound of the Formula (I) in a suitably flavored aqueous sucrose solution. Similarly an elixir is prepared utilizing a hydroalcoholic vehicle. Elixirs are advantageous vehicles for use when another therapeutic agent which is not sufficiently water soluble is to be included in the composition, as discussed hereinafter.

For the treatment of mammals by oral administration, a compound of the Formula (I) or a pharmacologically acceptable acid addition salt thereof is conveniently prepared in the form of a food premix. The food premix will comprise the active material in admixture with an edible diluent such as starch, oatmeal, flour, calcium carbonate, talc, dried fish meal and like nontoxic, orally acceptable edible diluents. The prepared premix is then conveniently added to the regular feed, thereby providing medication to the mammal in the course of feeding.

For parenteral administration, aqueous fluid unit dosage forms may be prepared. In preparing the parenteral form, a measured amount of a water soluble salt of a compound of the Formula (I) and a pharmacologically acceptable acid is placed in a vial; the vial and its contents sterilized and sealed by conventional methods. An accompanying vial of sterile water is provided as a vehicle to form a solution prior to administration. Advantageously, the sterile water will have dissolved therein a local anesthetic and/or conventional buffering agents.

A parenteral suspension may be prepared by suspending an insoluble form of a compound of the Formula (I) in a sterile aqueous vehicle or in a parenterally acceptable vegetable oil with or without additional conventional adjuvants.

Advantageously the compounds (I) and pharmaceutically acceptable acid addition salts thereof may also be combined with sedatives and tranquilizers such as phenobarbital, pentobarbital, chloral hydrate, chlorpromazine, thioridazine, diazepam and the like when sedation or tranquilization of the mammal being treated is also desired.

Combinations with other antihypertensive agents such as hydralazine hydrochloride, hexamethonium bromide, mecamylamine hydrochloride, phenoxybenzamine hydrochloride, guanethidine sulfate, methyldopa and the like may be advantageous in over-coming developing tolerance or "resistance" to such agents.

Combinations with antidepressant agents such as damphetamine, pheniprazine hydrochloride, tranylcypromine, imipramine, desipramine, amitriptyline, nortriptyline, protriptyline and methylphenidate hydrochloride may be made when considered desirable.

Combinations with diuretic agents such as ethoxolamide, hydrochlorothiazide, trichlormethiazide, acetazolamide, chlorthalidone, triamterene, quinethazone, cyclothiazide, chlorothiazide, benzthiazide and the like may also be advantageous in the treatment of hypertension.

Illustratively, in combination with the compounds of the invention, the other active compounds are administered with dosages as indicated: anti-anxiety and tranquilizing agents; chlorpromazine (5–50 mg.), thioridazine (5–100 mg.), haloperidol (0.5–5 mg.), meprobamate (100–400 mg.), ectylurea (100–300 mg.), chlordiazepoxide (5–50 mg.) and diazepam (2–15 mg.); antidepressants such as amitriptyline hydrochloride (10–50 mg.), methylphenidate hydrochloride (5–20 mg.), d-amphetamine sulfate (2–15 mg.) and methamphetamine hydrochloride (2–15 mg.); antihypertensive and diuretic agents such as hydrochlorothiazide (15–50 mg.), hydralazine (10–100 mg.), methyldopa (100–250 mg.), guanethidine (10–50 mg.), ethoxzolamide (50–150 mg.) and reserpine (0.05–1 mg.), barbiturates such as phenobarbital (8–60 mg.), butabarbital (8–60 mg.) and amobarbital (16–120 mg.); analgesics such as aspirin (150–600 mg.) and acetaminophen (150–600 mg.).

The compounds (I) are generally well known as is their preparation; see for Example U.S. Pat. Nos. 3,399,212 and 3,455,948; G. Pellizzari et al., Gazz. Chim. Ital., 48, II, 151–82, (1918); Paget et al., J. Med. Chem., 12, 1010, (1969). The acid addition salts of the compounds (I) are prepared by reacting the free base (I) with a stoichiometric proportion of an appropriate acid such as hydrochloric acid. The method is well known to those skilled in the art, and may be carried out in aqueous or non-aqueous media such as ethanol, ether, ethyl acetate and the like. Illustrative of pharmaceutically acceptable acid addition salts are those formed upon reaction of the compounds (I) with hydrochloric acid, hydrobromic acid, sulfuric acid, phosphoric acid, acetic acid, lactic acid, citric acid, succinic acid, benzoic acid, salicylic acid, pamoic acid, cyclohexanesulfamic acid and the like.

A number of the acid addition salts of the compounds (I) are hygroscopic and readily form hydrates. The hydrated forms, such as for example the hydrate of the hydrochloric acid salts of compounds of the Formula (I) may be employed in the same manner as the nonhydrate forms for the treatment of hypertension.

The following examples describe the manner and process of making and using the invention and set forth the best mode contemplated by the inventors of carrying out the invention but are not to be construed as limiting.

EXAMPLE 1

An aqueous suspension for oral administration is prepared by suspending a compound (I) (all of which may be prepared by the methods set forth in U.S. Pat. No. 3,399,212; Pellizzari et al., supra. or Paget et al., supra.) or a pharmaceutically acceptable acid addition salt thereof at a concentration of 5 mg./ml. in aqueous solution containing 1 percent of sodium carboxymethylcellulose. This suspension is used for bringing about hypotensive effects in unanesthetized normotensive rats. The rats are prepared for measuring blood pressure directly from the aorta through a chronic indwelling cannula [method of Weeks and Jones, Proc. Soc. Exptl. Biol. and Med., 104, 646, (1960)].

Employing groups of four female rats each (Sprague-Dawley, The Upjohn Company, average weight 250 to 350 grams), 50 mg. per kilogram of body weight of rat, of various compounds of the Formula (I) or an acid addition salt thereof are orally administered to the rats, and arterial blood pressure measurements obtained prior to, at 4 hours and 24 hours after administration. The blood pressure measurements obtained and the reduction of blood pressure obtained for each compound (I) employed are set forth in Table (I) below.

TABLE 1

| Compound | Average Initial B.P. mm. of Hg. | Average B.P. change mm. of Hg. | |
|---|---|---|---|
| | | 4 hr. | 24 hr. |
| 1. (5,6-dimethyl-2-benzimidazolyl)urea | 127 | −38 | −35 |
| 2. (5,6-dimethyl-2-benzimidazolyl)urea hydrochloride | 132 | −45 | −33 |

The above Table I illustrates the effectiveness of the compounds (I) of the invention and their acid addition salts in reducing blood pressure in a mammal. A compound is deemed effective, which will reduce means arterial pressures by at least 10 mm. of mercury.

Similarly, repeating the above procedure, but replacing the compounds of Formula (I) or their acid addition salts as used therein with the following compounds of the Formula (I) all of which are prepared according to the methods of U.S. Pat. No. 3,399,212 or Pellizzari, supra; a hypotensive effect is observed:

(5-bromo-2-benzimidazolyl)urea;
(5-trifluoromethyl-2-benzimidazolyl)urea;
1-(5,6-dichloro-2-benzimidazolyl)-3-isopropylurea;
1-(5-ethoxy-2-benzimidazolyl)-3,3-ethylurea;
(5-methyl-2-benzimidazolyl)urea;
(5-methyl-2-benzimidazolyl)urea hydrochloride;
(5-chloro-2-benzimidazolyl)urea;
(5-methoxy-2-benzimidazolyl)urea hydrochloride monohydrate;
1-(5,6-dimethyl-2-benzimidazolyl)-3-methylurea; and
1-(5,6-dimethyl-2-benzimidazolyl)-3,3-dimethylurea.

We claim:
1. A method of treating hypertension in mammals which comprises administering to hypertensive mammals an effective amount for reducing hypertension of a compound selected from the group consisting of compounds of the formula:

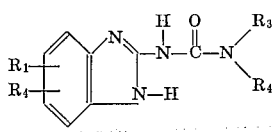

and the pharmaceutically acceptable acid addition salts thereof wherein $R_1$ and $R_2$ are each selected from hydrogen, halogen, lower-alkyl, lower alkoxy, and trifluoromethyl provided that when $R_1$ is hydrogen $R_2$ is selected from halogen, lower alkyl, lower alkoxy and trifluromethyl; $R_3$ and $R_4$ are each selected from hydrogen and lower alkyl.

2. A method according to claim 1 wherein said effective amount is within the range of from about 0.5 mg. to about 50 mg. per kilogram body weight of the recipient mammal, administered daily.

3. A method according to claim 1 wherein said mammal is a human.

4. A method according to claim 1 wherein said compound is selected from the group consisting of compounds of the formula:

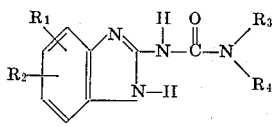

and the pharmaceutically acceptable acid addition salts thereof wherein $R_1$ and $R_2$ are each selected from hydrogen, bromine, chlorine, methyl and methoxy provided that when $R_1$ is hydrogen, $R_2$ is bromine, chlorine, methyl or methoxy; $R_3$ and $R_4$ are each selected from hydrogen and methyl.

5. A method according to claim 1 wherein said compound is (5,6-dimethyl-2-benzimidazolyl)urea.

6. A method according to claim 1 wherein said compound is (5,6-dimethyl-2-benzimidazolyl)urea hydrochloride.

7. A method according to claim 1 wherein said compound is (5-methyl-2-benzimidazolyl)urea.

8. A method according to claim 1 wherein said compound is (5-methyl-2-benzimidazolyl)urea hydrochloride.

9. A method according to claim 1 wherein said compound is (5-chloro-2-benzimidazolyl)urea.

10. A method according to claim 1 wherein said compound is (5-methoxy-2-benzimidazolyl)urea hydrochloride monohydrate.

11. A method according to claim 1 wherein said compound is 1-(5,6-dimethyl-2-benzimidazolyl)-3-methylurea.

12. A method according to claim 1 wherein said compound is 1-(5,6-dimethyl-2-benzimidazolyl)-3,3-dimethylurea.

13. A method according to claim 1 wherein said compound is 1-(5-methyl)-2-benzimidazolyl)-3-methylurea.

14. A method according to claim 1 wherein said compound is 1-(5-methyl-2-benzimidazolyl)-3,3-dimethylurea.

* * * * *